US010371048B2

United States Patent

(12) United States Patent
Yamauchi et al.

(10) Patent No.: US 10,371,048 B2
(45) Date of Patent: Aug. 6, 2019

(54) COMBUSTOR AND GAS TURBINE

(71) Applicant: MITSUBISHI HITACHI POWER SYSTEMS, LTD., Kanagawa (JP)

(72) Inventors: Takahiro Yamauchi, Tokyo (JP); Keijiro Saito, Tokyo (JP); Satoshi Takiguchi, Tokyo (JP); Koichi Nishida, Tokyo (JP); Masakazu Nose, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 467 days.

(21) Appl. No.: 15/049,667

(22) Filed: Feb. 22, 2016

(65) Prior Publication Data

US 2017/0241339 A1 Aug. 24, 2017

(51) Int. Cl.

| | |
|---|---|
| ***F02C 3/30*** | (2006.01) |
| ***F01K 21/04*** | (2006.01) |
| *F23R 3/28* | (2006.01) |
| *F23D 11/10* | (2006.01) |
| *F23D 11/16* | (2006.01) |
| *F23R 3/00* | (2006.01) |

(52) U.S. Cl.

CPC ............ *F02C 3/305* (2013.01); *F01K 21/047* (2013.01); *F02C 3/30* (2013.01); *F23D 11/10* (2013.01); *F23D 11/16* (2013.01); *F23D 2209/30* (2013.01); *F23R 3/00* (2013.01); *F23R 3/28* (2013.01); *F23R 3/283* (2013.01)

(58) Field of Classification Search

CPC .... F23R 3/00; F23R 3/28; F23R 3/283; F02C 3/30; F02C 3/305; F23D 11/10; F23D 11/16; F23D 2209/30

See application file for complete search history.

(56) References Cited

U.S. PATENT DOCUMENTS

| | | | | |
|---|---|---|---|---|
| 6,209,310 | B1 | 4/2001 | Küenzi et al. | |
| 6,370,863 | B2 * | 4/2002 | Muller | F02C 7/228 60/776 |
| 6,662,547 | B2 * | 12/2003 | Mandai | F23D 11/38 239/424 |
| 6,715,295 | B2 * | 4/2004 | Gadde | F02C 3/30 60/39.3 |
| 8,911,520 | B2 * | 12/2014 | Moller | B01D 53/62 48/197 R |

(Continued)

FOREIGN PATENT DOCUMENTS

| | | |
|---|---|---|
| JP | 11-218034 | 8/1999 |
| JP | 11-311404 | 11/1999 |

(Continued)

OTHER PUBLICATIONS

Notice of Rejection dated Feb. 28, 2017 in corresponding Japanese Application No. 2014-001977, with English Translation.

*Primary Examiner* — Craig Kim

(74) *Attorney, Agent, or Firm* — Wenderoth, Lind & Ponack, L.L.P.

(57) ABSTRACT

A combustor having a plurality of nozzles (main nozzles) to supply fuel disposed, includes a water supplier that is connected to all or part of the plurality of nozzles to supply water to each of a plurality of fuel pipes. The water supplier is configured to vary a supply amount of water for each of plurality of nozzles to which the water is supplied.

9 Claims, 10 Drawing Sheets

(56) References Cited

U.S. PATENT DOCUMENTS

| | | | | |
|---|---|---|---|---|
| 8,951,039 | B2 * | 2/2015 | Yoshida | F23R 3/26 137/803 |
| 8,973,366 | B2 * | 3/2015 | Zhang | F23K 5/06 137/897 |
| 9,243,804 | B2 * | 1/2016 | Zhang | F23K 5/005 |
| 9,447,730 | B2 * | 9/2016 | Ochiai | F02C 7/00 |
| 2001/0023578 | A1 * | 9/2001 | Braun | F23D 11/16 60/773 |
| 2009/0241548 | A1 | 10/2009 | Danis et al. | |
| 2010/0269508 | A1 * | 10/2010 | Saito | F23R 3/14 60/748 |
| 2013/0097991 | A1 | 4/2013 | Zhang et al. | |
| 2013/0098041 | A1 * | 4/2013 | Zhang | F23K 5/005 60/734 |
| 2015/0377133 | A1 * | 12/2015 | Kanebako | F02C 3/30 60/39.54 |
| 2016/0265431 | A1 * | 9/2016 | Tamura | F02C 3/30 |
| 2017/0138268 | A1 * | 5/2017 | Nakahara | F02C 7/22 |

FOREIGN PATENT DOCUMENTS

| | | |
|---|---|---|
| JP | 11-350978 | 12/1999 |
| JP | 2005-195284 | 7/2005 |
| JP | 2008-31847 | 2/2008 |
| JP | 2011-516809 | 5/2011 |
| JP | 2013-92357 | 5/2013 |

* cited by examiner

AXIAL DIRECTION

COMBUSTOR AND GAS TURBINE

FIELD

The present invention relates to a combustor and a gas turbine to which the combustor is applied.

BACKGROUND

Conventionally, for example, a combustor disclosed in Japanese Patent Publication 11-311404 injects water, together with fuel with the aim of reduction of NOx (nitrogen oxides).

An object of the present invention is to provide a combustor and a gas turbine capable of suppressing an occurrence of combustion vibration, while maintaining low NOx.

SUMMARY

Technical Problem

In this regard, uniformization of the fuel concentration is effective in reduction of NOx (nitrogen oxides). Meanwhile, when the fuel concentration supplied from each fuel nozzle is uniform, the combustion states of the fuel injected from the fuel nozzles become equal, and the distribution of the heat generation rate in a central axis direction in a combustor becomes equal over the entire circumference of the combustor. Therefore, a region on which the peak of the heat generation rate concentrates is generated in the combustor. Further, there is a new problem in which combustion vibration is likely to occur due to the concentrated heat generation.

SUMMARY

Solution to Problem

According to the present invention, there is provided a combustor having a plurality of nozzles to supply fuel disposed, the combustor comprising a water supplier that is connected to all or part of the plurality of nozzles to supply water to each of fuel pipes, wherein the water supplier varies a supply amount of water for each of the nozzles to which the water is supplied.

DESCRIPTION OF EMBODIMENTS

Embodiments according to the present invention will be described below in detail with reference to the drawings. Further, the present invention is not limited by the embodiments. Further, constituent elements in the following embodiments include elements that can be easily replaced by those skilled in the art or the substantially same elements.

Figure 1:
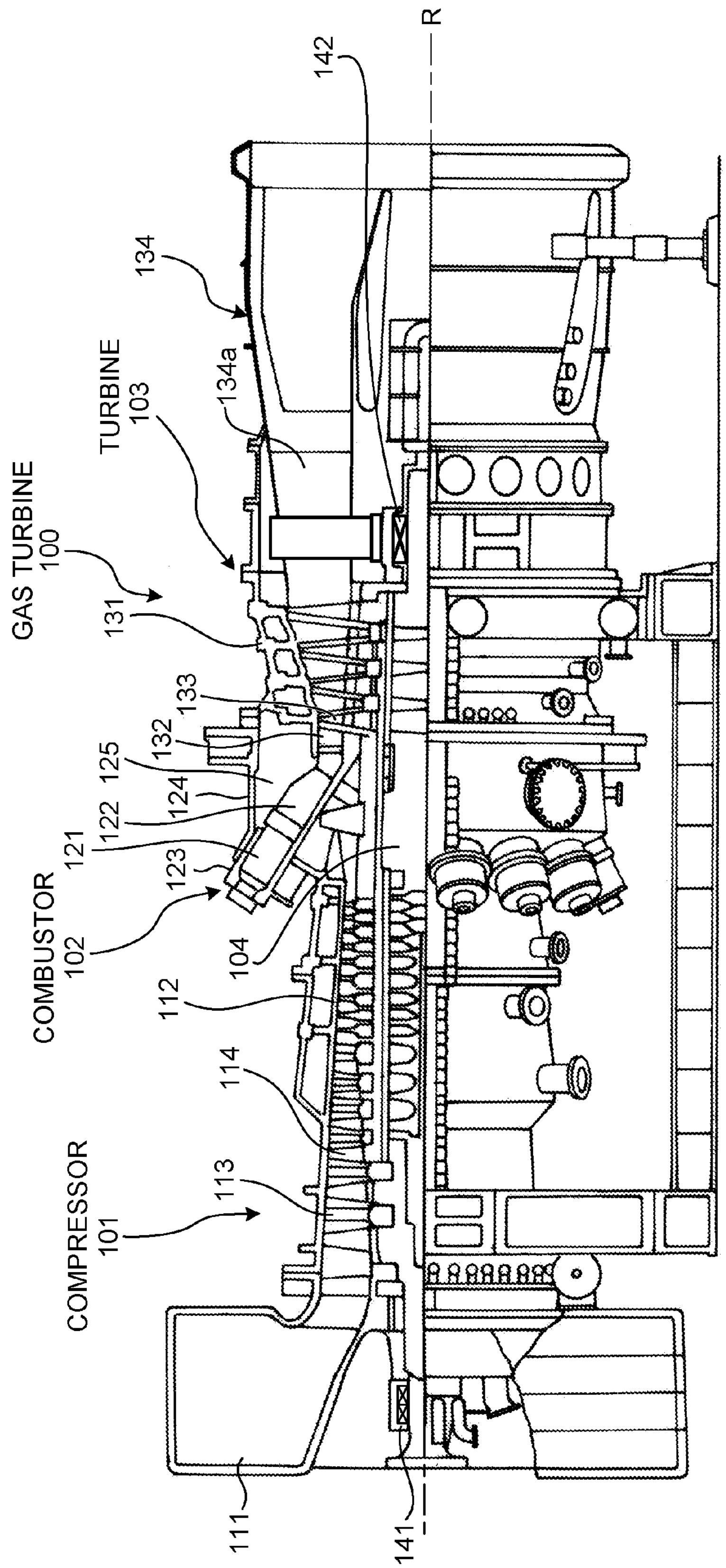
FIG. 1 is a schematic configuration diagram of a gas turbine according to an embodiment of the present invention.

FIG. 1 is a schematic configuration diagram of a gas turbine according to this embodiment.

As illustrated in FIG. 1, a gas turbine 100 is configured to include a compressor 101, a combustor 102 and a turbine 103. Further, in the gas turbine 100, a rotor 104 is disposed to penetrate in the center of the compressor 101, the combustor 102 and turbine 103. The compressor 101, the combustor 102 and the turbine 103 are sequentially provided in a row toward the rear side from the front side of air flow along an axis center R of the rotor 104. Further, in the following description, a turbine axial direction refers to a direction parallel to the axis center R, and a turbine circumferential direction refers to a circumferential direction around the axis center R.

The compressor 101 compresses air to generate compressed air. In the compressor 101, a compressor vane 113 and a compressor blade 114 are provided in a compressor casing 112 having an air intake port 111 that takes in air. The plurality of compressor vanes 113 is mounted on the compressor casing 112 side and is provided in a row in the turbine circumferential direction. Further, the plurality of compressor blades 114 is mounted on the rotor 104 side and is provided in a row in the turbine circumferential direction. The compressor vanes 113 and the compressor blades 114 are alternately provided along the turbine axial direction.

The combustor 102 generates a combustion gas of high-temperature and high-pressure, by supplying fuel (liquid fuel: mainly oil combustion) to the compressed air compressed by the compressor 101. The combustor 102 has, as a combustion chamber, an inner cylinder 121 that mixes and combusts the compressed air and fuel, a transition piece 122 that guides the combustion gas to the turbine 103 from the inner cylinder 121, and an outer cylinder 123 that covers an outer circumference of the inner cylinder 121 and forms an air passage 125 that guides the compressed air from the compressor 101 to the inner cylinder 121. The plurality of (for example, sixteen) combustors 102 is provided in a row to the combustor casing 124 in the turbine circumferential direction. Further, the fuel may be a gaseous fuel without being limited to the liquid fuel.

The turbine 103 generates rotational power by the combustion gas that is combusted in the combustor 102. In the turbine 103, a turbine vane 132 and a turbine blade 133 are provided in a turbine casing 131. The plurality of turbine vanes 132 is mounted on the turbine casing 131 side and is provided in a row in the turbine circumferential direction. Furthermore, the plurality of turbine blades 133 is mounted on the rotor 104 side and is provided in a row in the turbine circumferential direction. The turbine vanes 132 and the turbine blade 133 are alternately provided along the turbine axial direction. Further, an exhaust chamber 134 having an exhaust diffuser 134*a* continued to the turbine 103 is provided on the rear side of the turbine casing 131.

The rotor 104 is provided to be freely rotatable about the axis center R in such a manner that an end of the compressor 101 side is supported by a bearing unit 141 and an end of the exhaust chamber 134 side is supported by a bearing unit 142. Further, a drive shaft of a generator (not illustrated) is connected to the end, which is located on the compressor 101 side, of the rotor 104.

When the air taken in from the air intake port 111 of the compressor 101 passes through the plurality of compressor vanes 113 and compressor blades 114 and is compressed in the gas turbine 100, the air becomes high-temperature and high-pressure compressed air. When the fuel is mixed and combusted with the compressed air in the combustor 102, high-temperature and high-pressure combustion gas is generated. Further, when the combustion gas passes though the turbine vanes 132 and the turbine blades 133 of the turbine 103, the rotor 104 is rotationally driven and imparts a rotational power to a generator coupled to the rotor 104 to generate power. Further, the flue gas after rotationally driving the rotor 104 is released to the atmosphere, after being converted to a static pressure by the exhaust diffuser 134*a* of the exhaust chamber 134.

[First Embodiment]

Figure 2:
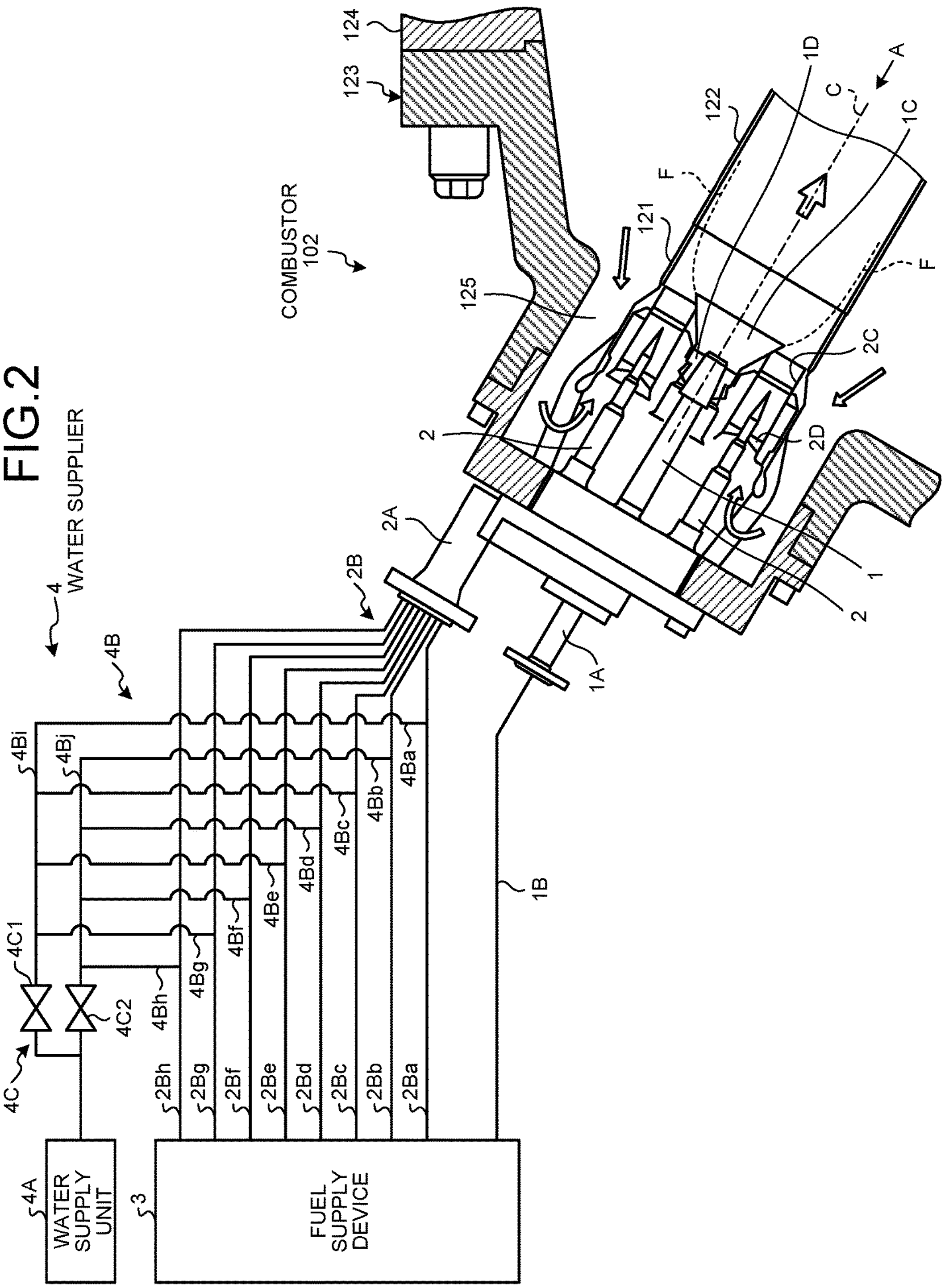
FIG. 2 is a configuration diagram of a combustor according to a first embodiment of the present invention.
Figure 3:
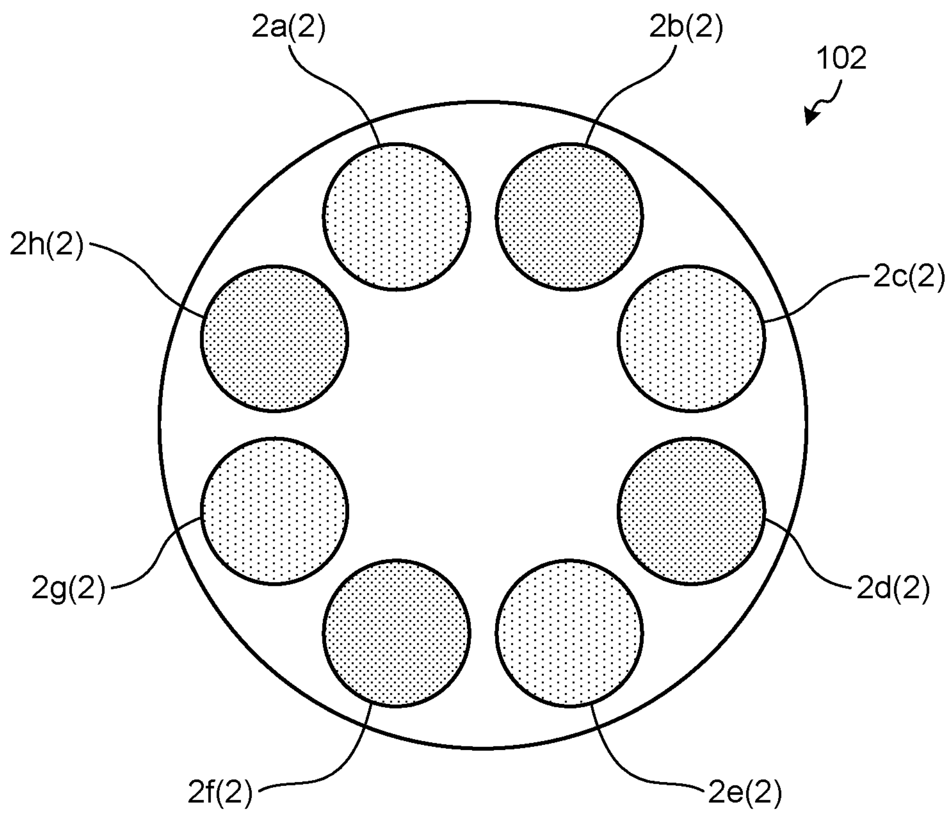
FIG. 3 is a schematic diagram taken in the direction of an arrow A in FIG. 2.
Figure 4:
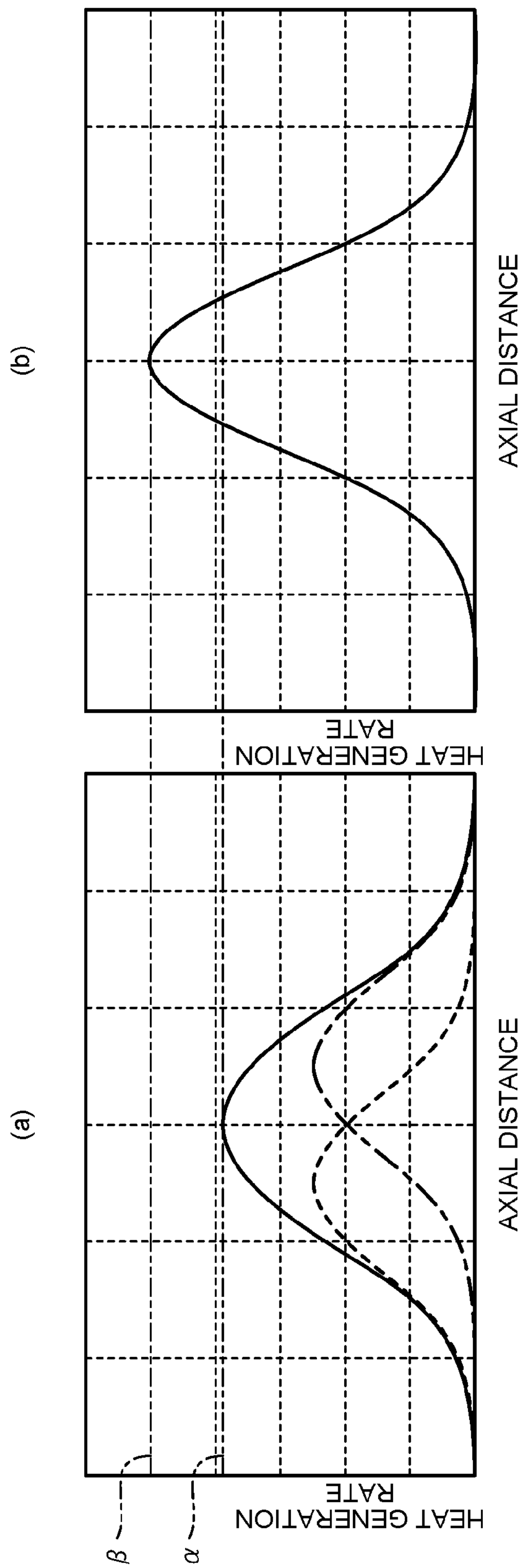
FIG. 4 is a graph that compares combustion rates in the combustor according to the first embodiment of the present invention.

FIG. 2 is a configuration diagram of the combustor according to the embodiment, FIG. 3 is a schematic diagram taken in the direction of an arrow A in FIG. 2, and FIG. 4 is a graph that compares combustion rates in the combustor according to this embodiment.

As illustrated in FIG. 2, the combustor 102 is provided with a pilot nozzle 1 and a main nozzles 2 that supply the fuel. The single pilot nozzle 1 is provided on the central axis C that is the center of the inner cylinder 121. In the pilot nozzle 1, a pilot fuel line 1B is connected to a fuel port 1A that is provided outside the combustor 102. The pilot fuel line 1B is connected to a fuel supply device 3. The fuel supply device 3 supplies fuel to the pilot fuel line 1B, and although it is not clearly illustrated in the drawings, the fuel supply device 3 has a pump that pumps the fuel, a valve that starts and stops the supply of fuel, and a flow rate control mechanism that controls the flow rate of the fuel. That is, the fuel is supplied to the pilot nozzle 1 via the pilot fuel line 1B and the fuel port 1A by the fuel supply device 3, and the fuel is injected from the pilot nozzle 1. On the circumference of the leading end of the pilot nozzle 1, a pilot cone 1C formed in a tubular shape, the leading end of which being formed at a wide angle, is provided. Furthermore, the pilot nozzle 1 is provided with a swirler vane 1D between its outer circumferential surface and an inner circumferential surface of the pilot cone 1C.

The plurality of (eight in this embodiment: see FIG. 3) of main nozzles 2 is provided in the circumferential direction to surround the pilot nozzle 1. Main fuel lines 2Ba, 2Bb, 2Bc, 2Bd, 2Be, 2Bf, 2Bg and 2Bh as each fuel pipe 2B corresponding to main nozzles 2*a*, 2*b*, 2*c*, 2*d*, 2*e*, 2*f*, 2*g* and 2*h* illustrated in FIG. 3 are connected to each main nozzle 2 via a fuel port 2A provided outside the combustor 102. Each of the main fuel lines 2Ba, 2Bb, 2Bc, 2Bd, 2Be, 2Bf, 2Bg and 2Bh are connected to the fuel supply device 3. The fuel supply device 3 supplies fuel to each of the main fuel lines 2Ba, 2Bb, 2Bc, 2Bd, 2Be, 2Bf, 2Bg and 2Bh. That is, the fuel is supplied to each main nozzle 2 via each of the main fuel lines 2Ba, 2Bb, 2Bc, 2Bd, 2Be, 2Bf, 2Bg and 2Bh by the fuel supply device 3, and the fuel is injected from each main nozzle 2. The main nozzle 2 is provided with a burner cylinder 2C on the circumference of its leading end. Furthermore, the main nozzle 2 is provided with a swirler vane 2D between its outer circumferential surface and the inner circumferential surface of the burner cylinder 2C.

As illustrated in FIG. 2, in the combustor 102, the air flow of the high-temperature and high-pressure compressed air flows into the air passage 125, and the compressed air flows into the inner cylinder 121. Within the inner cylinder 121, the compressed air is mixed with fuel injected from the main nozzles 2 and becomes a swirling flow of a premixed gas in the burner cylinder 2C and the swirler vane 2D to flow into the transition piece 122. Further, the fuel-air mixture is mixed with fuel injected from the pilot nozzle 1, is combusted by being ignited by a pilot flame (not illustrated) and is injected into the transition piece 122 as a combustion gas. At this time, when some of the combustion gas is jetted so as to be diffused to the circumference with a flame in the transition piece 122, the premixed gas from the burner cylinder 2C of each main nozzle 2 is ignited and is combusted. That is, by the diffusion flame caused by the fuel injected from the pilot nozzle 1, the flame stabilization for stabilizing the combustion of the premixed gas from the burner cylinder 2C of each main nozzle 2 is performed. Further, a boundary between the premixed gas from the burner cylinder 2C of each main nozzle 2 and the flame in the combustion gas is referred to as a flame front F.

Such a combustor 102 is referred to as a premixed combustion type combustor. Since the premixed combustion type combustor 102 premixes the fuel and the compressed air and combusts them, it is possible to uniformize the fuel concentration, which is effective in the reduction of NOx.

As illustrated in FIG. 2, the combustor 102 of this embodiment has a water supplier 4. The water supplier 4 is connected to the main fuel lines 2Ba, 2Bb, 2Bc, 2Bd, 2Be, 2Bf, 2Bg and 2Bh as each fuel pipe 2B to supply water to the fuel to each main nozzle 2. The water supplier 4 has a water supply unit 4A, a water supply line 4B and a variable water supply unit 4C.

Although it is not clearly illustrated in the drawings, the water supply unit 4A has a tank that stores water, a pump that pumps water or the like, and supplies water.

The water supply line 4B is connected between the water supply unit 4A and each of the main fuel lines 2Ba, 2Bb, 2Bc, 2Bd, 2Be, 2Bf, 2Bg and 2Bh. Specifically, the water supply line 4B includes a water supply pipe 4Ba connected to the main fuel line 2Ba, a water supply pipe 4Bb connected to the main fuel line 2Bb, a water supply pipe 4Bc connected to the main fuel line 2Bc, a water supply pipe 4Bd connected to the main fuel line 2Bd, a water supply pipe 4Be connected to the main fuel line 2Be, a water supply pipe 4Bf connected to the main fuel line 2Bf, a water supply pipe 4Bg connected to the main fuel line 2Bg, and a water supply pipe 4Bh connected to the main fuel line 2Bh. Further, the water supply line 4B includes a first branch pipe 4Bi that is connected to the water supply unit 4A and the water supply pipes 4Ba, 4Bc, 4Be and 4Bg. Further, the water supply line 4B includes a second branch pipe 4Bj that is connected to the water supply unit 4A and the water supply pipes 4Bb, 4Bd, 4Bf and 4Bh.

That is, the water supply line 4B branches from the water supply unit 4A into the first branch pipe 4Bi and the second branch pipe 4Bj. Further, the first branch pipe 4Bi is connected to the main fuel lines 2Ba, 2Bc, 2Be and 2Bg via the water supply pipes 4Ba, 4Bc, 4Be and 4Bg. The second branch pipe 4Bj is connected to the main fuel lines 2Bb, 2Bd, 2Bf and 2Bh via the water supply pipes 4Bb, 4Bd, 4Bf and 4Bh. Therefore, water supplied from the water supply unit 4A is added to the fuel of the main fuel lines 2Ba, 2Bc, 2Be and 2Bg via the water supply pipes 4Ba, 4Bc, 4Be and 4Bg on the first branch pipe 4Bi side, and is supplied to the main nozzles 2*a*, 2*c*, 2*e* and 2*g* illustrated in FIG. 3, together with fuel. Further, water supplied from the water supply unit 4A is added to the fuel of the main fuel lines 2Bb, 2Bd, 2Bf and 2Bh via the water supply pipes 4Bb, 4Bd, 4Bf and 4Bh on the second branch pipe 4Bj side, and is supplied to the main nozzles 2*b*, 2*d*, 2*f* and 2*h* illustrated in FIG. 3, together with fuel.

The variable water supply unit 4C changes the supply amount of the water supplied from the water supply unit 4A. In this embodiment, the variable water supply unit 4C includes a first flow rate control valve 4C1 disposed in the first branch pipe 4Bi, and a second flow rate control valve 4C2 disposed in the second branch pipe 4Bj. The first flow rate control valve 4C1 and the second flow rate control valve 4C2 are set such that the supply amounts of water are different from each other. That is, the variable water supply unit 4C makes the supply amount of water to the main nozzles 2*a*, 2*c*, 2*e* and 2*g* illustrated in FIG. 3 and the supply amount of water to the main nozzles 2*b*, 2*d*, 2*f* and 2*h* different from each other. In this embodiment, as illustrated in FIG. 3, the plurality of main nozzles 2 is disposed in the order of the main nozzles 2*a*, 2*b*, 2*c*, 2*d*, 2*e*, 2*f*, 2*g* and 2*h* in the circumferential direction to alternately make the supply amounts of water different from each other.

In this way, the combustor 102 of this embodiment is provided with a water supplier 4 that is connected to each of the main nozzles 2*a*, 2*b*, 2*c*, 2*d*, 2*e*, 2*f*, 2*g* and 2*h* to supply water to each fuel pipe 2B, in the combustor 102 in which the plurality of main nozzles 2 (2*a*, 2*b*, 2*c*, 2*d*, 2*e*, 2*f*, 2*g* and 2*h*) for supplying the fuel is disposed, and the water supplier 4 varies a supply amount of water for each main nozzle 2 to which water is supplied. Specifically, as described above, the combustor 102 of this embodiment makes the supply amount of water to the main nozzles 2*a*, 2*c*, 2*e* and 2*g* and the supply amount of water to the main nozzles 2*b*, 2*d*, 2*f* and 2*h* different from each other, by the water supplier 4.

In FIG. 4, the combustion rate in the combustor 102 (FIG. 4(*a*)) equipped with the water supplier 4 according to this embodiment is compared to the combustion rate in the combustor (FIG. 4(*b*)) of a comparative example in which the supply amount of water is uniform. As illustrated in FIG. 4(*b*), in the combustor of the comparative example, the fuel concentrations supplied from each of the main nozzles 2*a*, 2*b*, 2*c*, 2*d*, 2*e*, 2*f*, 2*g* and 2*h* are uniform, and the combustion states of the fuel injected from each of the main nozzles 2*a*, 2*b*, 2*c*, 2*d*, 2*e*, 2*f*, 2*g* and 2*h* become equal, and the distribution of the heat generation rates in a direction parallel to the central axis C in the combustor (referred to as a central axis direction) becomes equal over the entire circumference of the combustor. Therefore, a region on which the peak of the heat generation rate concentrates is formed in the combustor. Further, a peak value (β) of the heat generation rate obtained totally in the entire circumference of the combustor becomes higher due to the concentrated heat generation, and the combustion vibration is likely to occur.

Meanwhile, as illustrated in FIG. 4(*a*), in the combustor 102 equipped with the water supplier 4 according to this embodiment, by making the supply amount of water to the main nozzles 2*a*, 2*c*, 2*e* and 2*g* and the supply amount of water to the main nozzles 2*b*, 2*d*, 2*f* and 2*h* different from each other by the water supplier 4, the concentration of fuel supplied from the main nozzles 2*a*, 2*c*, 2*e* and 2*g* and the concentration of fuel supplied from the main nozzles 2*b*, 2*d*, 2*f* and 2*h* are different from each other. Thus, the combustion states of the fuel injected from the main nozzles with the different fuel concentrations are different from each other, and the distribution of the heat generation rate in the central axis direction of the combustor 102 is dispersed over the entire circumference of the combustor 102.

Specifically, in FIG. 4(*a*), the supply amount of water to the main nozzles 2*a*, 2*c*, 2*e* and 2*g* indicated by a broken line is set to be smaller than that of the comparative example, and the supply amount of water to the main nozzles 2*b*, 2*d*, 2*f* and 2*h* indicated by a chain line is set to be greater than that of the comparative example. The absolute values of the supply amounts of water are the same. For example, when the water is not added, the combustion energy becomes a force that raises the temperature of the combustion gas itself. In contrast, when water is supplied to the fuel, since the combustion energy also needs to be imparted to water, the combustion speed decreases. When the combustion speed decreases, the power of the flame is suppressed, and a flame front F of a boundary between the premixed gas from the burner cylinder 2C and the flame is moved to the downstream side (the turbine 103 side) in the central axis direction. Therefore, when the supply amounts of water are varied, the flame front F of the main nozzles 2*a*, 2*c*, 2*e* and 2*g* with relatively small supply amount of water is moved to the upstream side (the compressor 101 side), and the flame front F of the main nozzles 2*b*, 2*d*, 2*f* and 2*h* with relatively large supply amount of water is moved to the downstream side. Therefore, the peak of the heat generation rate is distributed in the central axial direction over the entire circumference of the combustor 102, and a peak value (α) of the heat generation rate obtained totally in the entire circumference of the combustor 102 becomes lower than that of the comparative example. As a result, the combustion vibration is suppressed.

According to the combustor 102 of this embodiment as described above, it is possible to maintain low NOx by supplying water to each of the main nozzles 2*a*, 2*b*, 2*c*, 2*d*, 2*e*, 2*f*, 2*g* and 2*h* using the water supplier 4. Moreover, by supplying the different supply amounts of water to the main nozzles 2*a*, 2*b*, 2*c*, 2*d*, 2*e*, 2*f*, 2*g* and 2*h* using the water supplier 4, the combustion states of the fuel injected from the main nozzles with the different fuel concentrations are different from each other, and the distribution of heat generation rate is dispersed in the central axis direction of the combustor 102 over the entire circumference of the combustor 102. Thus, it is possible to suppress a peak value of the heat generation rate obtained totally in the entire circumference of the combustor 102, and it is possible to suppress an occurrence of the combustion vibration.

According to the combustor 102 of this embodiment, by supplying different amounts of water to each of the main nozzles 2*a*, 2*b*, 2*c*, 2*d*, 2*e*, 2*f*, 2*g* and 2*h* disposed around a pilot nozzle 1 in the circumferential direction, the combustion states of the fuel injected from the main nozzles 2*a*, 2*b*, 2*c*, 2*d*, 2*e*, 2*f*, 2*g* and 2*h* with different fuel concentrations are different from each other, and it is possible to disperse the distribution of the heat generation rate in the central axis direction in the combustor 102 over the entire circumference of the combustor 102. Therefore, it is possible to suppress a peak value of the heat generation rate obtained totally in the entire circumference of the combustor 102, and to obtain an effect of remarkably suppressing an occurrence of the combustion vibration.

Further, the gas turbine 100 of this embodiment includes the above-described combustor 102.

According to the gas turbine 100, by supplying water to each of the main nozzles 2*a*, 2*b*, 2*c*, 2*d*, 2*e*, 2*f*, 2*g* and 2*h* using the water supplier 4 in the combustor 102, it is possible to maintain the low NOx of the combustion gas that is sent to the turbine 103. Moreover, by supplying the different supply amounts of water to each of the main nozzles 2*a*, 2*b*, 2*c*, 2*d*, 2*e*, 2*f*, 2*g* and 2*h* using the water supplier 4, the combustion states of the fuel injected from the main nozzles with the different fuel concentrations are different from each other, and the distribution of heat generation rate is dispersed in the central axis direction of the combustor 102 over the entire circumference of the combustor 102. Thus, it is possible to suppress a peak value of the heat generation rate obtained totally in the entire circumference of the combustor 102, thereby suppressing an occurrence of the combustion vibration, and it is possible to suppress the vibration transmitted from the combustor 102.

Furthermore, in this embodiment, the main fuel lines 2Ba, 2Bb, 2Bc, 2Bd, 2Be, 2Bf, 2Bg and 2Bh are connected to each of the main nozzles 2, and the water supply pipes 4Ba, 4Bb, 4Bc, 4Bd, 4Be, 4Bf, 4Bg and 4Bh are connected to each of the main fuel lines 2Ba, 2Bb, 2Bc, 2Bd, 2Be, 2Bf, 2Bg and 2Bh, but it is not limited thereto. Specifically, in this embodiment, since the first branch pipe 4Bi and the second branch pipe 4Bj supply different amounts of water in the water supplier 4, although it is not clearly illustrated in the drawings, the two fuel pipes 2B may be connected to the first branch pipe 4Bi and the second branch pipe 4Bj such that fuel and water are supplied to each main nozzle 2 to which the same amount of water needs to be supplied from the two fuel pipes 2B via the fuel port 2A.

Further, in this embodiment, although the water supplier 4 is configured to be connected to all of the main nozzles 2 to supply water to each of the fuel pipes, the water supplier 4 may be configured to be connected to a part of the main nozzles 2 to supply water to each of the fuel pipes.

[Second Embodiment]

Figure 5:
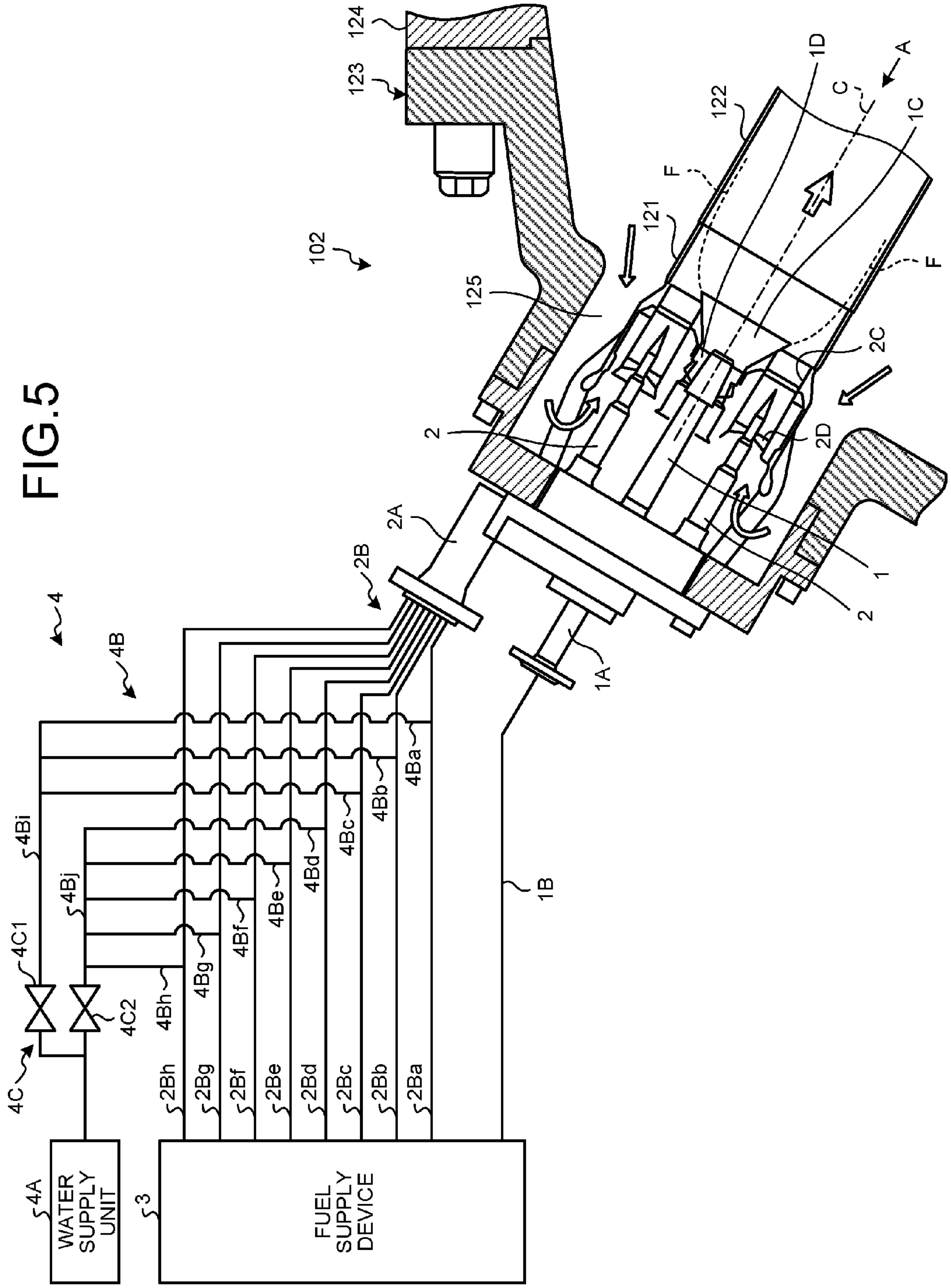
FIG. 5 is a configuration diagram of a combustor according to a second embodiment of the present invention.
Figure 6:
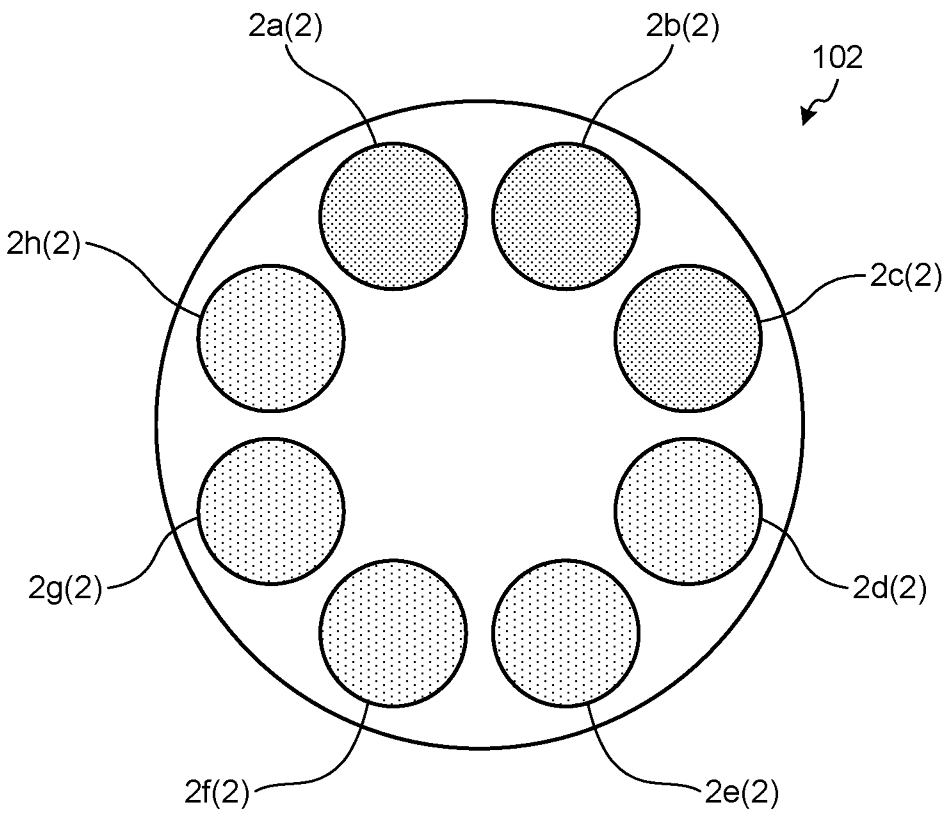
FIG. 6 is a schematic diagram taken in the direction of an arrow A in FIG. 5.

FIG. 5 is a configuration diagram of a combustor according to the embodiment. FIG. 6 is a schematic diagram taken in the direction of an arrow A in FIG. 5. The combustor 102 of this embodiment is different in the configuration of the water supplier 4 from the combustor 102 illustrated in the above-described first embodiment. Therefore, in the following description, the same components as in the first embodiment are denoted by the same reference numerals, and the description thereof will not be provided.

As illustrated in FIG. 5, the combustor 102 of this embodiment has a water supplier 4. The water supplier 4 is connected to the main fuel lines 2Ba, 2Bb, 2Bc, 2Bd, 2Be, 2Bf, 2Bg and 2Bh as each fuel pipe 2B to supply water to the fuel to each main nozzle 2. The water supplier 4 has a water supply unit 4A, a water supply line 4B and a variable water supply unit 4C.

Although it is not clearly illustrated in the drawings, the water supply unit 4A has a tank that stores water and a pump that pumps water, and supplies water.

The water supply line 4B is connected between the water supply unit 4A and each of the main fuel lines 2Ba, 2Bb, 2Bc, 2Bd, 2Be, 2Bf, 2Bg and 2Bh. Specifically, the water supply line 4B includes a water supply pipe 4Ba connected to the main fuel line 2Ba, a water supply pipe 4Bb connected to the main fuel line 2Bb, a water supply pipe 4Bc connected to the main fuel line 2Bc, a water supply pipe 4Bd connected to the main fuel line 2Bd, a water supply pipe 4Be connected to the main fuel line 2Be, a water supply pipe 4Bf connected to the main fuel line 2Bf, a water supply pipe 4Bg connected to the main fuel line 2Bg, and a water supply pipe 4Bh connected to the main fuel line 2Bh. Further, the water supply line 4B includes a first branch pipe 4Bi that is connected to the water supply unit 4A and the water supply pipes 4Ba, 4Bb and 4Bc. Further, the water supply line 4B includes a second branch pipe 4Bj that is connected to the water supply unit 4A and the water supply pipes 4Bd, 4Be, 4Bf, 4Bg and 4Bh.

That is, the water supply line 4B branches from the water supply unit 4A into the first branch pipe 4Bi and the second branch pipe 4Bj. Further, the first branch pipe 4Bi is connected to the main fuel lines 2Ba, 2Bb and 2Bc via the water supply pipes 4Ba, 4Bb and 4Bc. The second branch pipe 4Bj is connected to the main fuel lines 2Bd, 2Be, 2Bf, 2Bg and 2Bh via the water supply pipes 4Bd, 4Be, 4Bf, 4Bg and 4Bh. Therefore, water supplied from the water supply unit 4A is added to the fuel of the main fuel lines 2Ba, 2Bb and 2Bc via the water supply pipes 4Ba, 4Bb and 4Bc on the first branch pipe 4Bi side, and water and fuel are supplied to the main nozzles 2*a*, 2*b* and 2*c* illustrated in FIG. 6. Further, water supplied from the water supply unit 4A is added to the fuel of the main fuel lines 2Bd, 2Be, 2Bf, 2Bg and 2Bh via the water supply pipes 4Bd, 4Be, 4Bf, 4Bg and 4Bh on the second branch pipe 4Bj side, and water and fuel are supplied to the main nozzles 2*d*, 2*e*, 2*f*, 2*g* and 2*h* illustrated in FIG. 6.

The variable water supply unit 4C changes the supply amount of the water supplied from the water supply unit 4A. In this embodiment, the variable water supply unit 4C includes a first flow rate control valve 4C1 disposed in the first branch pipe 4Bi, and a second flow rate control valve 4C2 disposed in the second branch pipe 4Bj. The first flow rate control valve 4C1 and the second flow rate control valve 4C2 are set such that the supply amounts of water are different from each other. That is, the variable water supply unit 4C makes the supply amount of water to the main nozzles 2*a*, 2*b* and 2*c* illustrated in FIG. 6 and the supply amount of water to the main nozzles 2*d*, 2*e*, 2*f*, 2*g* and 2*h* different from each other. In this embodiment, as illustrated in FIG. 6, a plurality of main nozzles 2 is disposed in the order of 2*a*, 2*b*, 2*c*, 2*d*, 2*e*, 2*f*, 2*g* and 2*h* in the circumferential direction, and is divided into two groups of the main nozzles 2*a*, 2*b* and 2*c* and the main nozzles 2*d*, 2*e*, 2*f*, 2*g* and 2*h* of different numbers to vary the supply amount of water to each group. Incidentally, the main nozzle is not limited to two groups and may be divided into a plurality of groups of different numbers. Further, although the groups of different numbers are configured by the main nozzles that are continuously adjacent to each other, the groups may not be configured in this way.

Thus, the combustor 102 of this embodiment is provided with the water supplier 4 that is connected to each of the main nozzles 2*a*, 2*b*, 2*c*, 2*d*, 2*e*, 2*f*, 2*g* and 2*h* to supply water to each fuel pipe 2B, in the combustor 102 in which a plurality of main nozzles 2 (2*a*, 2*b*, 2*c*, 2*d*, 2*e*, 2*f*, 2*g* and 2*h*) for supplying the fuel is disposed, and the water supplier 4 varies a supply amount of water for each main nozzle 2 to which the water is supplied. Specifically, as described above, the combustor 102 of this embodiment makes the supply amount of water to the main nozzles 2*a*, 2*b* and 2*c* and the supply amount of water to the main nozzles 2*d*, 2*e*, 2*f*, 2*g* and 2*h* different from each other, by the water supplier 4.

In FIG. 4, the combustion rate of the combustor 102 (FIG. 4(*a*)) equipped with the water supplier 4 according to this embodiment is compared to the combustion rate in the combustor (FIG. 4(*b*)) of a comparative example in which the supply amount of water is uniform. As illustrated in FIG. 4(*b*), in the combustor of the comparative example, the fuel concentrations supplied from each of the main nozzles 2*a*, 2*b*, 2*c*, 2*d*, 2*e*, 2*f*, 2*g* and 2*h* are uniform, and the combustion states of the fuel injected from each of the main nozzles 2*a*, 2*b*, 2*c*, 2*d*, 2*e*, 2*f*, 2*g* and 2*h* become equal, and the distribution of the heat generation rates in a direction parallel to the central axis C in the combustor (referred to as a central axis direction) becomes equal over the entire circumference of the combustor. Therefore, a region on which the peak of the heat generation rate concentrates is formed in the combustor. Further, the peak value (β) of the heat generation rate obtained totally in the entire circumference of the combustor becomes higher due to the concentrated heat generation, and the combustion vibration is likely to occur.

Meanwhile, as illustrated in FIG. 4(*a*), in the combustor 102 equipped with the water supplier 4 according to this embodiment, by making the supply amount of water to the main nozzles 2*a*, 2*b* and 2*c* and the supply amount of water to the main nozzles 2*d*, 2*e*, 2*f*, 2*g* and 2*h* different from each other by the water supplier 4, the concentration of fuel supplied from the main nozzles 2*a*, 2*b* and 2*c* and the concentration of fuel supplied from the main nozzles 2*d*, 2*e*, 2*f*, 2*g* and 2*h* are different from each other. Thus, the combustion states of the fuel injected from the main nozzles with the different fuel concentrations are different from each other, and the distribution of the heat generation rate in the central axis direction in the combustor 102 is dispersed over the entire circumference of the combustor 102.

Specifically, in FIG. 4(*a*), the supply amount of water to the main nozzles 2*a*, 2*b* and 2*c* indicated by a broken line is set to be greater than that of the comparative example, and the supply amount of water to the main nozzles 2*d*, 2*e*, 2*f*, 2*g* and 2*h* indicated by a chain line is set to be smaller than that of the comparative example. The absolute values of the supply amounts of water are the same. For example, when the water is not added, the combustion energy becomes a force that raises the temperature of the combustion gas itself. In contrast, when the water is supplied to the fuel, since the combustion energy also needs to be imparted to water, the combustion speed decreases. When the combustion speed decreases, the power of the flame is suppressed, and a flame front F of a boundary between the premixed gas from the burner cylinder 2C and the flame is moved to the downstream side (the turbine 103 side) in the central axis direction. Therefore, when the supply amount of water is varied, the flame front F of the main nozzles 2*a*, 2*b* and 2*c* with the relatively large supply amount of water is moved to the downstream side, and the flame front F of the main nozzles 2*d*, 2*e*, 2*f*, 2*g* and 2*h* with the relatively small supply amount of water is moved to the upstream side (the compressor 101 side). Therefore, the peak of the heat generation rate is distributed in the central axial direction over the entire circumference of the combustor 102, and the peak value (α) of the heat generation rate obtained totally in the entire circumference of the combustor 102 becomes lower than that of the comparative example. As a result, the combustion vibration is suppressed.

According to the combustor 102 of this embodiment, it is possible to maintain low NOx by supplying water to each of the main nozzles 2*a*, 2*b*, 2*c*, 2*d*, 2*e*, 2*f*, 2*g* and 2*h* using the water supplier 4. Moreover, by supplying the different supply amounts of water to each of the main nozzles 2*a*, 2*b*, 2*c*, 2*d*, 2*e*, 2*f*, 2*g* and 2*h* using the water supplier 4, the combustion states of the fuel injected from the main nozzles with the different fuel concentrations are different from each other, and the distribution of heat generation rate is dispersed in the central axis direction of the combustor 102 over the entire circumference of the combustor 102. Thus, it is possible to suppress a peak value of the heat generation rate obtained totally in the entire circumference of the combustor 102, and it is possible to suppress an occurrence of the combustion vibration.

Further, in the combustor 102 of this embodiment, the plurality of main nozzles 2*a*, 2*b*, 2*c*, 2*d*, 2*e*, 2*f*, 2*g* and 2*h* is divided into at least two different numbers of groups (the main nozzles 2*a*, 2*b* and 2*c* and the main nozzles 2*d*, 2*e*, 2*f*, 2*g* and 2*h*), and the different supply amounts of water are supplied to the main nozzles of each group by the water supplier 4.

For example, in the above-described first embodiment, an even number of main nozzles 2 is disposed in the order of the main nozzles 2*a*, 2*b*, 2*c*, 2*d*, 2*e*, 2*f*, 2*g* and 2*h* in the circumferential direction to alternately vary the supply amount of water. In this case, the distribution in the circumferential direction of the heat generation rate in the combustor 102 becomes equal. Therefore, the combustion vibration tends to occur in the circumferential direction. In contrast, according to the combustor 102 of this embodiment, since the different supply amounts of water is supplied to the main nozzles of each group with the different numbers (the main nozzles 2*a*, 2*b* and 2*c* and the main nozzles 2*d*, 2*e*, 2*f*, 2*g* and 2*h*), the circumferential distribution of the heat generation rate in the combustor 102 is dispersed, and thus it is possible to suppress an occurrence of combustion vibration in the circumferential direction.

Further, the gas turbine 100 of this embodiment includes the above-described combustor 102.

According to the gas turbine 100, by supplying water to each of the main nozzles 2*a*, 2*b*, 2*c*, 2*d*, 2*e*, 2*f*, 2*g* and 2*h* using the water supplier 4 in the combustor 102, it is possible to maintain the low NOx of the combustion gas that is sent to the turbine 103. Moreover, by supplying the different supply amounts of water to each of the main nozzles 2*a*, 2*b*, 2*c*, 2*d*, 2*e*, 2*f*, 2*g* and 2*h* using the water supplier 4, the combustion states of the fuel injected from the main nozzles with the different fuel concentrations are different from each other, and the distribution of heat generation rate is dispersed in the central axis direction of the combustor 102 over the entire circumference of the combustor 102. Thus, it is possible to suppress a peak value of the heat generation rate obtained totally in the entire circumference of the combustor 102 to suppress an occurrence of the combustion vibration, and it is possible to suppress the vibration transmitted from the combustor 102.

Moreover, according to the gas turbine 100, in the combustor 102, by providing the different supply amounts of water to the different numbers of main nozzles of each group (the main nozzles 2*a*, 2*b*, 2*c* and the main nozzles 2*d*, 2*e*, 2*f*, 2*g* and 2*h*) using the water supplier 4, the circumferential distribution of the heat generation rate in the combustor 102 is dispersed. Thus, it is also possible to suppress an occurrence of the combustion vibration in the circumferential direction, and it is possible to suppress the vibration transmitted from the combustor 102.

Further, in this embodiment, the main fuel lines 2Ba, 2Bb, 2Bc, 2Bd, 2Be, 2Bf, 2Bg and 2Bh are connected to each of the main nozzles 2, and water supply pipes 4Ba, 4Bb, 4Bc, 4Bd, 4Be, 4Bf, 4Bg and 4Bh are connected to each of the main fuel lines 2Ba, 2Bb, 2Bc, 2Bd, 2Be, 2Bf, 2Bg and 2Bh, but it is not limited thereto. Specifically, in this embodiment, in the water supplier 4, since the different amounts of water is provided by the first branch pipe 4Bi and the second branch pipe 4Bj, although it is not clearly illustrated in the drawings, the two fuel pipes 2B may be connected to the first branch pipe 4Bi and the second branch pipe 4Bj such that fuel and water are supplied to each main nozzle 2 to which the same amount of water needs to be supplied from the two fuel pipes 2B via the fuel port.

Further, in this embodiment, although the water supplier 4 is configured to be connected to all of the main nozzles 2 to supply water to each of the fuel pipes, the water supplier 4 may be configured to be connected to a part of the main nozzles 2 to supply water to each of the fuel pipes.

[Third Embodiment]

Figure 7:
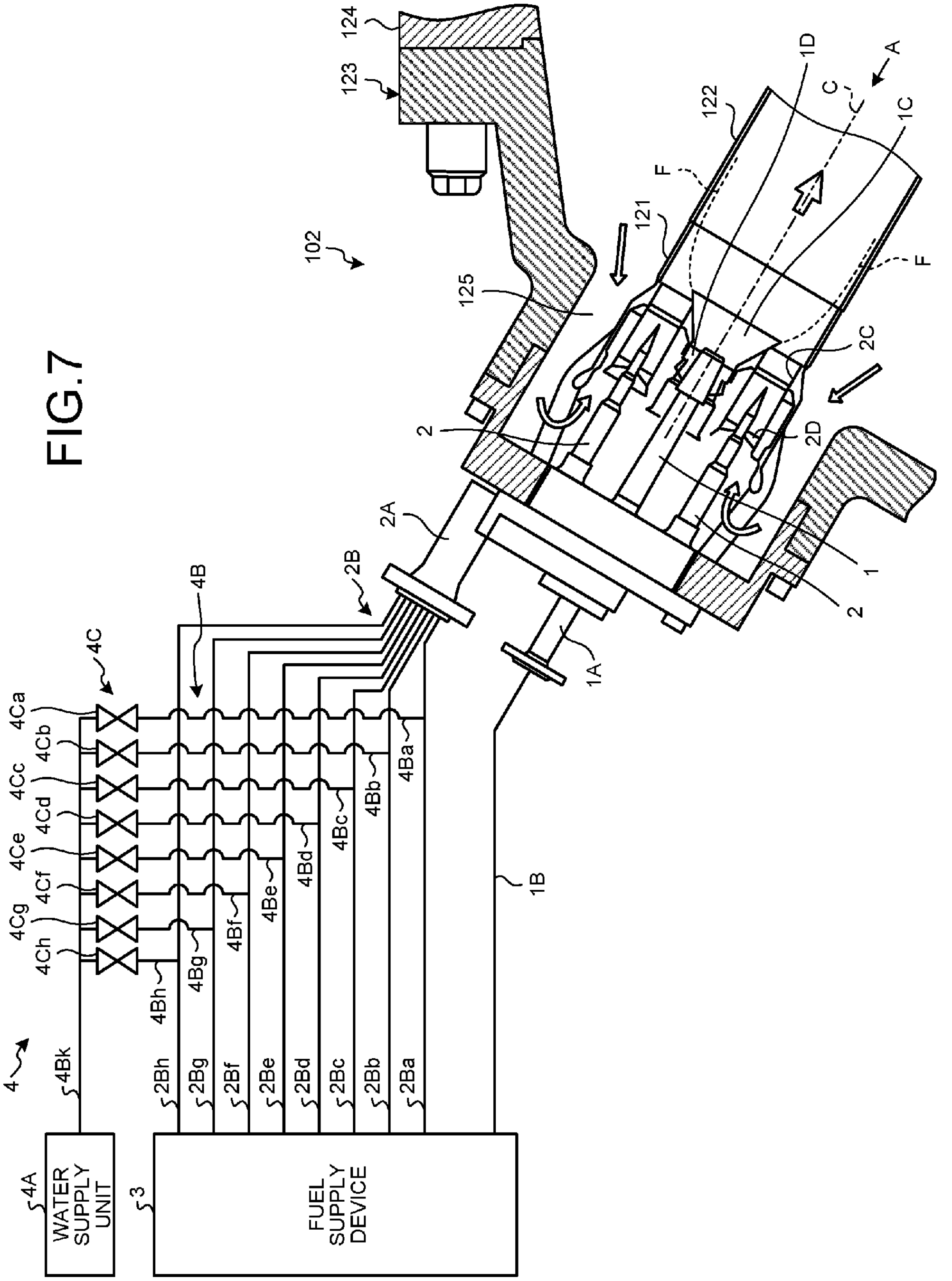
FIG. 7 is a configuration diagram of a combustor according to a third embodiment of the present invention.
Figure 8:
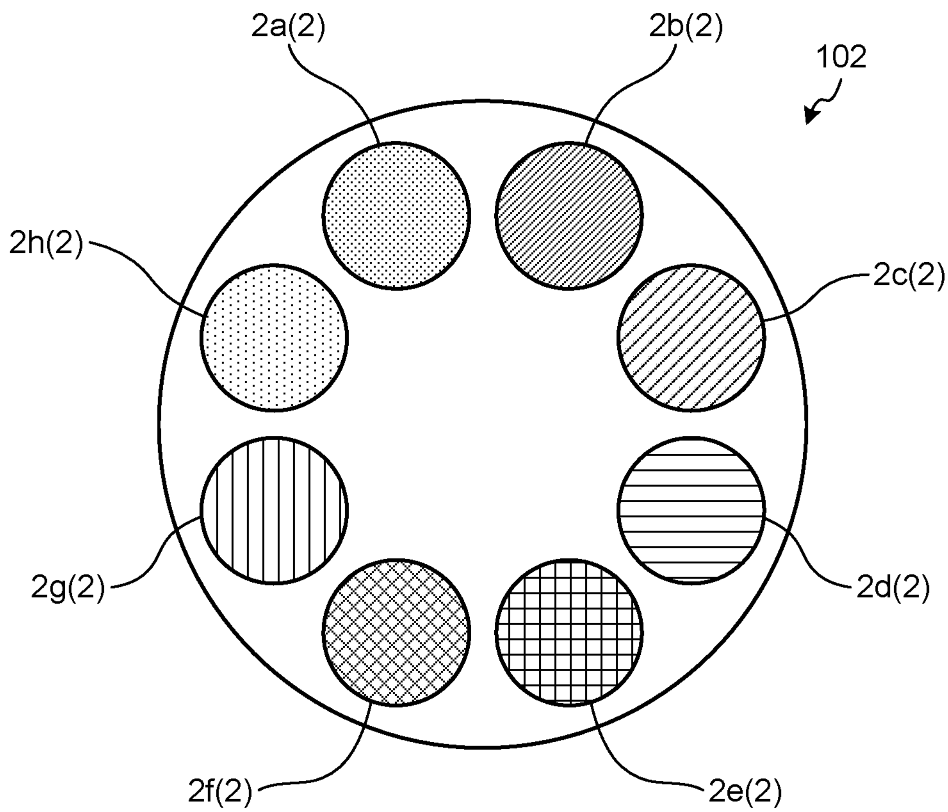
FIG. 8 is a schematic diagram taken in the direction of an arrow A in FIG. 7.
Figure 9:
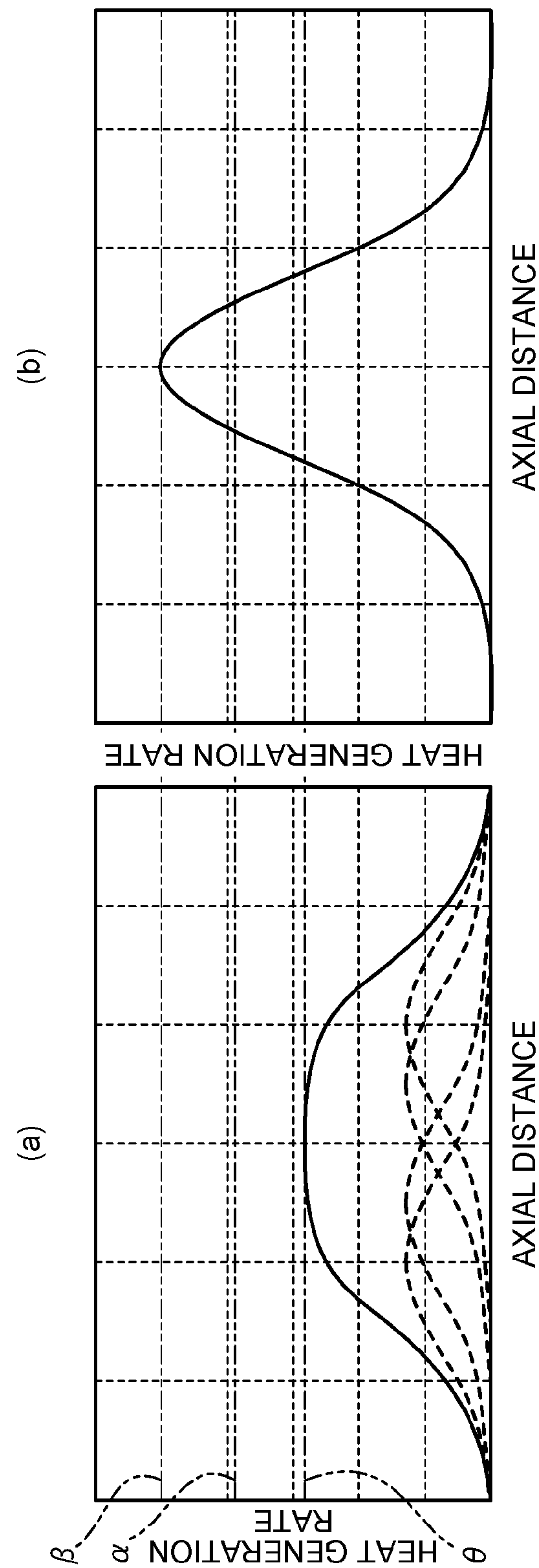
FIG. 9 is a graph that compares combustion rates in the combustor according to the third embodiment of the present invention.

FIG. 7 is a configuration diagram of a combustor according to this embodiment. FIG. 8 is a schematic diagram taken in the direction of an arrow A in FIG. 7. FIG. 9 is a graph that compares the combustion rates in the combustor according to this embodiment. The combustor 102 of this embodiment is different in the configuration of the water supplier 4 from the combustor 102 illustrated in the above-described first embodiment. Therefore, in the following description, the same components as in the first embodiment are denoted by the same reference numerals, and the description thereof will not be provided.

As illustrated in FIG. 7, the combustor 102 of this embodiment has a water supplier 4. The water supplier 4 is connected to the main fuel lines 2Ba, 2Bb, 2Bc, 2Bd, 2Be, 2Bf, 2Bg and 2Bh as each fuel pipe 2B to supply water to the fuel to each main nozzle 2. The water supplier 4 has a water supply unit 4A, a water supply line 4B and a variable water supply unit 4C.

Although it is not clearly illustrated in the drawings, the water supply unit 4A has a tank that stores water and a pump that pumps water, and supplies water.

The water supply line 4B is connected between the water supply unit 4A and each of the main fuel lines 2Ba, 2Bb, 2Bc, 2Bd, 2Be, 2Bf, 2Bg and 2Bh. Specifically, the water supply line 4B includes a water supply pipe 4Ba connected to the main fuel line 2Ba, a water supply pipe 4Bb connected to the main fuel line 2Bb, a water supply pipe 4Bc connected to the main fuel line 2Bc, a water supply pipe 4Bd connected to the main fuel line 2Bd, a water supply pipe 4Be connected to the main fuel line 2Be, a water supply pipe 4Bf connected to the main fuel line 2Bf, a water supply pipe 4Bg connected to the main fuel line 2Bg, and a water supply pipe 4Bh connected to the main fuel line 2Bh. Further, the water supply line 4B includes a main pipe 4Bk that is connected to the water supply unit 4A and the water supply pipes 4Ba, 4Bb, 4Bc, 4Bd, 4Be, 4Bf, 4Bg and 4Bh.

That is, the water supply line 4B is connected to the main fuel lines 2Ba, 2Bb, 2Bc, 2Bd, 2Be, 2Bf, 2Bg and 2Bh via the water supply pipes 4Ba, 4Bb, 4Bc, 4Bd, 4Be, 4Bf, 4Bg and 4Bh through the main pipe 4Bk from the water supply unit 4A. Therefore, water supplied from the water supply unit 4A is added to the fuel of the main fuel lines 2Ba, 2Bb, 2Bc, 2Bd, 2Be, 2Bf, 2Bg and 2Bh via the water supply pipes 4Ba, 4Bb, 4Bc, 4Bd, 4Be, 4Bf, 4Bg and 4Bh, and water and fuel are supplied to the main nozzles 2*a*, 2*b*, 2*c*, 2*d*, 2*e*, 2*f*, 2*g* and 2*h* illustrated in FIG. 8.

The variable water supply unit 4C changes the supply amount of the water supplied from the water supply unit 4A. In this embodiment, the variable water supply unit 4C includes a first flow rate control valve 4Ca provided in a water supply pipe 4Ba, a second flow rate control valve 4Cb provided in a water supply pipe 4Bb, a third flow rate control valve 4Cc provided in a water supply pipe 4Bc, a fourth flow rate control valve 4Cd provided in a water supply pipe 4Bd, a fifth flow rate control valve 4Ce provided in a water supply pipe 4Be, a sixth flow rate control valve 4Cf provided in a water supply pipe 4Bf, a seventh flow rate control valve 4Cg provided in a water supply pipe 4Bg, and an eighth flow rate control valve 4Ch provided in a water supply pipe 4Bh. The respective flow rate control valves 4Ca, 4Cb, 4Cc, 4Cd, 4Ce, 4Cf, 4Cg and 4Ch are set such that the respective supply amounts of water are different from each other. That is, the variable water supply unit 4C makes the supply amount of water to the main nozzles 2*a*, 2*b*, 2*c*, 2*d*, 2*e*, 2*f*, 2*g* and 2*h* illustrated in FIG. 8 different from each other. In this embodiment, as illustrated in FIG. 8, although the plurality of main nozzles 2 is disposed in the order of 2*a*, 2*b*, 2*c*, 2*d*, 2*e*, 2*f*, 2*g* and 2*h* in the circumferential direction, the supply amount of water may gradually increase or decrease according to the order of the circumferential direction of the main nozzle 2, or may not depend on the order.

In this way, the combustor 102 of this embodiment is provided with the water supplier 4 that is connected to each of the main nozzles 2*a*, 2*b*, 2*c*, 2*d*, 2*e*, 2*f*, 2*g* and 2*h* to supply water to each fuel pipe 2B, in the combustor 102 in which the plurality of main nozzles 2 (2*a*, 2*b*, 2*c*, 2*d*, 2*e*, 2*f*, 2*g* and 2*h*) for supplying the fuel is disposed, and the water supplier 4 varies a supply amount of water for each main nozzle 2 to which the water is supplied. Specifically, as described above, the combustor 102 of this embodiment makes the supply amount of water to each of the main nozzles 2*a*, 2*b*, 2*c*, 2*d*, 2*e*, 2*f*, 2*g* and 2*h* different from one another, by the water supplier 4.

In FIG. 9, the combustion rate of the combustor 102 equipped with the water supplier 4 according to this embodiment (FIG. 9(*a*)) is compared to the combustion rate in the combustor of a comparative example in which the supply amount of water (FIG. 9(*b*)) is uniform. As illustrated in FIG. 9(*b*), in the combustor of the comparative example, the fuel concentrations supplied from each of the main nozzles 2*a*, 2*b*, 2*c*, 2*d*, 2*e*, 2*f*, 2*g* and 2*h* are uniform, and the combustion states of the fuel injected from each of the main nozzles 2*a*, 2*b*, 2*c*, 2*d*, 2*e*, 2*f*, 2*g* and 2*h* become equal, and the distribution of the heat generation rates in a direction parallel to the central axis C in the combustor (referred to as a central axis direction) becomes equal over the entire circumference of the combustor. Therefore, a region on which the peak of the heat generation rate concentrates is formed in the combustor. Further, the peak value (β) of the heat generation rate obtained totally in the entire circumference of the combustor becomes higher due to the concentrated heat generation, and the combustion vibration is likely to occur.

Meanwhile, as illustrated in FIG. 9(*a*), in the combustor 102 according to this embodiment equipped with the water supplier 4, since the supply amounts of water to the main nozzles 2*a*, 2*b*, 2*c*, 2*d*, 2*e*, 2*f*, 2*g* and 2*h* are different from each other by the water supplier 4, the concentrations of fuel supplied from each of the main nozzles 2*a*, 2*b*, 2*c*, 2*d*, 2*e*, 2*f*, 2*g* and 2*h* are different from one another. Thus, the combustion states of the fuel injected from the main nozzles with the different fuel concentrations are different from each other, and the distribution of the heat generation rate in the central axis direction of the combustor 102 is dispersed over the entire circumference of the combustor 102.

Specifically, in FIG. 9(*a*), the absolute value of the supply amounts of water to the main nozzles 2*a*, 2*b*, 2*c*, 2*d*, 2*e*, 2*f*, 2*g* and 2*h* indicated by broken lines is set to be the same as that of the comparative example, and each of the supply amounts of water are varied by being increased or decreased with respect to the comparative example. For example, when the water is not added, the combustion energy becomes a force that raises the temperature of the combustion gas itself. In contrast, when water to the fuel is supplied, since the combustion energy also needs to be imparted to water, the combustion speed decreases. When the combustion speed decreases, the power of the flame is suppressed, and a flame front F of a boundary between the premixed gas from the burner cylinder 2C and the flame is moved to the downstream side (the turbine 103 side) in the central axis direction. Therefore, when the supply amount of water is varied, the flame front F of the main nozzle 2 with the relatively large supply amount of water is moved to the downstream side, and the flame front F of the main nozzle 2 with the relatively small supply amount of water is moved to the upstream side (the compressor 101 side). Therefore, the peak of the heat generation rate is distributed in the central axial direction over the entire circumference of the combustor 102, and the peak value (θ) of the heat generation rate obtained totally in the entire circumference of the combustor 102 becomes lower than that of the comparative example. As a result, the combustion vibration is suppressed.

According to the combustor 102 of this embodiment, it is possible to maintain low NOx by supplying water to each of the main nozzles 2*a*, 2*b*, 2*c*, 2*d*, 2*e*, 2*f*, 2*g* and 2*h* using the water supplier 4. Moreover, by supplying the different supply amounts of water to each of the main nozzles 2*a*, 2*b*, 2*c*, 2*d*, 2*e*, 2*f*, 2*g* and 2*h* using the water supplier 4, the combustion states of the fuel injected from the main nozzles with the different fuel concentrations are different from one another, and the distribution of heat generation rate is dispersed in the central axis direction of the combustor 102 over the entire circumference of the combustor 102. Thus, it is possible to suppress a peak value of the heat generation rate obtained totally in the entire circumference of the combustor 102, and it is possible to suppress an occurrence of the combustion vibration.

Further, in the combustor 102 of this embodiment, the water supplier 4 supplies the different supply amounts of water to each of the main nozzles 2*a*, 2*b*, 2*c*, 2*d*, 2*e*, 2*f*, 2*g* and 2*h*.

For example, in the above-described first embodiment, an even number of main nozzles 2 is disposed in the order of the main nozzles 2*a*, 2*b*, 2*c*, 2*d*, 2*e*, 2*f*, 2*g* and 2*h* in the circumferential direction to alternately vary the supply amount of water. In this case, the distribution in the circumferential direction of the heat generation rate in the combustor 102 becomes equal. Therefore, the combustion vibration tends to occur in the circumferential direction. In contrast, according to the combustor 102 of this embodiment, since the different supply amounts of water is supplied to each of the main nozzles 2*a*, 2*b*, 2*c*, 2*d*, 2*e*, 2*f*, 2*g* and 2*h*, the circumferential distribution of the heat generation rate in the combustor 102 is dispersed, and thus it is possible to suppress an occurrence of combustion vibration in the circumferential direction.

Moreover, according to the combustor 102 of this embodiment, by supplying the different supply amounts of water to each of the main nozzles 2*a*, 2*b*, 2*c*, 2*d*, 2*e*, 2*f*, 2*g* and 2*h*, since the circumferential distribution of the heat generation rate of the combustor 102 is dispersed for each of the main nozzles 2*a*, 2*b*, 2*c*, 2*d*, 2*e*, 2*f*, 2*g* and 2*h*, the peak value (θ) of heat generation rate obtained totally in the entire circumference of the combustor 102 is suppressed than the peak value (α) of the first embodiment. Thus, it is possible to obtain a remarkable effect of suppressing an occurrence of the combustion vibration in the axial direction.

Further, the gas turbine 100 of this embodiment is equipped with the above-described combustor 102.

According to the gas turbine 100, in the combustor 102, by supplying different supply amounts of water to each of the main nozzles 2*a*, 2*b*, 2*c*, 2*d*, 2*e*, 2*f*, 2*g* and 2*h* using the water supplier 4, it is possible to maintain the low NOx of the combustion gas that is sent to the turbine 103. Moreover, by supplying the different supply amounts of water to each of the main nozzles 2*a*, 2*b*, 2*c*, 2*d*, 2*e*, 2*f*, 2*g* and 2*h* using the water supplier 4, the combustion states of the fuel injected from the main nozzles with the different fuel concentrations are different from each other, and the distribution of heat generation rate is dispersed in the central axis direction of the combustor 102 over the entire circumference of the combustor 102. Thus, it is possible to suppress a peak value of the heat generation rate obtained totally in the entire circumference of the combustor 102 to suppress an occurrence of the combustion vibration, and it is possible to suppress the vibration transmitted from the combustor 102.

Furthermore, according to the gas turbine 100, in the combustor 102, by supplying the different supply amounts of water to the each of the main nozzles 2*a*, 2*b*, 2*c*, 2*d*, 2*e*, 2*f*, 2*g* and 2*h* using the water supplier 4, the circumferential distribution of the heat generation rate of the combustor 102 is dispersed. Thus, it is also possible to suppress an occurrence of the combustion vibration in the circumferential direction and to suppress the vibration transmitted from the combustor 102. Furthermore, according to the gas turbine 100, in the combustor 102, since the different supply amounts of water is supplied to each of the main nozzles 2*a*, 2*b*, 2*c*, 2*d*, 2*e*, 2*f*, 2*g* and 2*h* using the water supplier 4, the peak value (θ) of the heat generation rate obtained totally in the entire circumference of the combustor 102 is suppressed than the peak value (α) of the first embodiment. Thus, it is possible to obtain a remarkable effect of suppressing an occurrence of the combustion vibration in the axial direction, and it is possible to obtain a remarkable effect of suppressing the vibration transmitted from the combustor 102.

[Fourth Embodiment]

Figure 10:
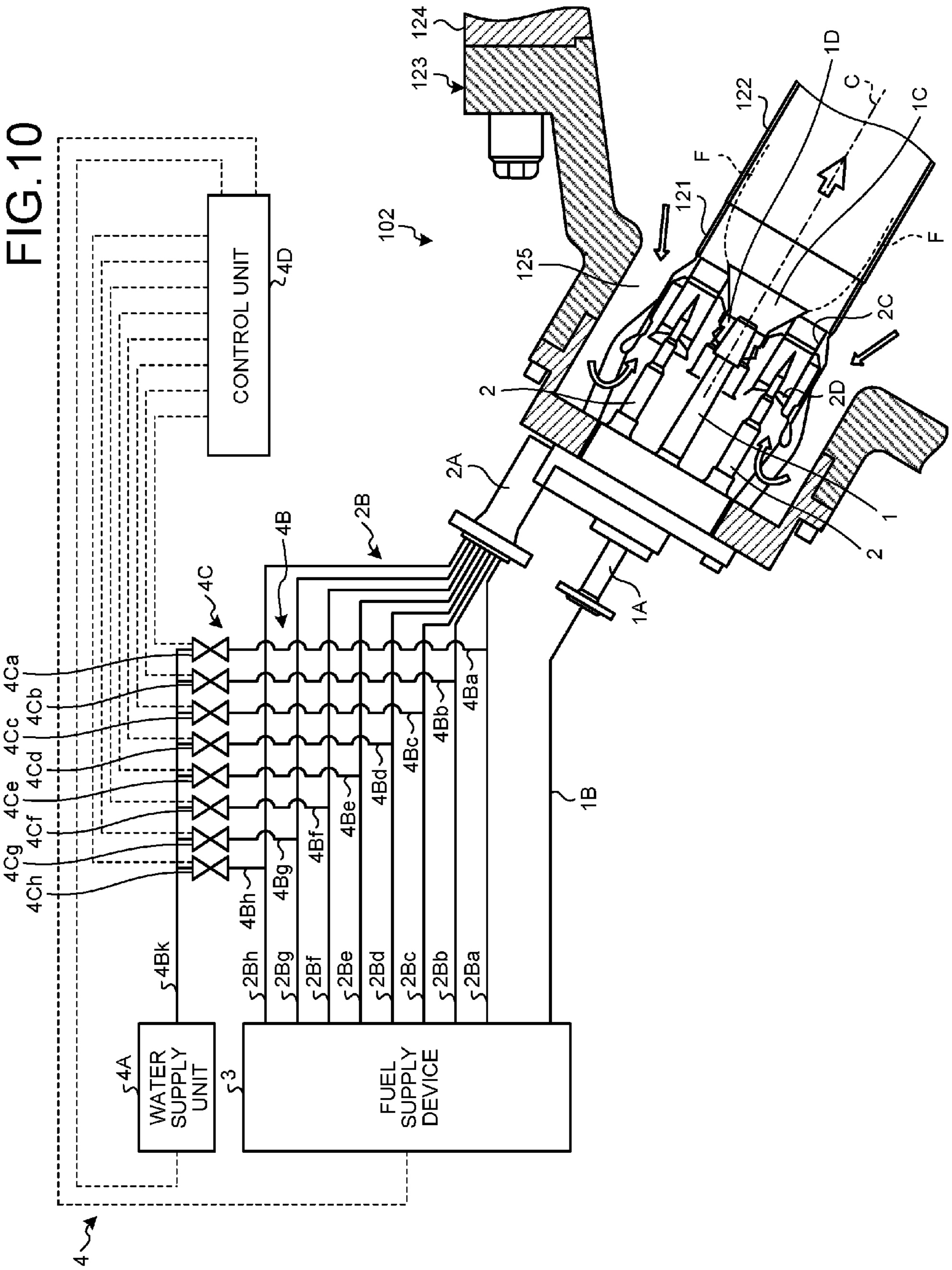
FIG. 10 is a configuration diagram of a combustor according to a fourth embodiment of the present invention.

FIG. 10 is a configuration diagram of a combustor according to this embodiment. The combustor 102 of this embodiment is different in the configuration of the water supplier 4 from the combustor 102 illustrated in the above-described first embodiment. Therefore, in the following description, the same components as in the first embodiment are denoted by the same reference numerals, and the description thereof will not be provided.

As illustrated in FIG. 10, the combustor 102 of this embodiment has a water supplier 4. The water supplier 4 is connected to the main fuel lines 2Ba, 2Bb, 2Bc, 2Bd, 2Be, 2Bf, 2Bg and 2Bh as each fuel pipe 2B to supply water to the fuel to each main nozzle 2. The water supplier 4 has a water supply unit 4A, a water supply line 4B, a variable water supply unit 4C and a control unit 4D.

Although it is not clearly illustrated in the drawings, the water supply unit 4A has a tank that stores water and a pump that pumps water, and supplies water.

The water supply line 4B is connected between the water supply unit 4A and each of the main fuel lines 2Ba, 2Bb, 2Bc, 2Bd, 2Be, 2Bf, 2Bg and 2Bh. Specifically, the water supply line 4B includes a water supply pipe 4Ba connected to the main fuel line 2Ba, a water supply pipe 4Bb connected to the main fuel line 2Bb, a water supply pipe 4Bc connected to the main fuel line 2Bc, a water supply pipe 4Bd connected to the main fuel line 2Bd, a water supply pipe 4Be connected to the main fuel line 2Be, a water supply pipe 4Bf connected to the main fuel line 2Bf, a water supply pipe 4Bg connected to the main fuel line 2Bg, and a water supply pipe 4Bh connected to the main fuel line 2Bh. Further, the water supply line 4B includes a main pipe 4Bk which is connected to the water supply unit 4A and the water supply pipes 4Ba, 4Bb, 4Bc, 4Bd, 4Be, 4Bf, 4Bg and 4Bh.

That is, the water supply line 4B is connected to the main fuel lines 2Ba, 2Bb, 2Bc, 2Bd, 2Be, 2Bf, 2Bg and 2Bh via the water supply pipes 4Ba, 4Bb, 4Bc, 4Bd, 4Be, 4Bf, 4Bg and 4Bh through the main pipe 4Bk from the water supply unit 4A. Therefore, water supplied from the water supply unit 4A is added to the fuel of the main fuel lines 2Ba, 2Bb, 2Bc, 2Bd, 2Be, 2Bf, 2Bg and 2Bh via the water supply pipes 4Ba, 4Bb, 4Bc, 4Bd, 4Be, 4Bf, 4Bg and 4Bh, and water and fuel are supplied to the main nozzles 2*a*, 2*b*, 2*c*, 2*d*, 2*e*, 2*f*, 2*g* and 2*h* illustrated in FIG. 10.

The variable water supply unit 4C changes the supply amount of the water supplied from the water supply unit 4A. In this embodiment, the variable water supply unit 4C includes a first flow rate control valve 4Ca provided in a water supply and discharge pipe 4Ba, a second flow rate control valve 4Cb provided in a water supply and discharge pipe 4Bb, a third flow rate control valve 4Cc provided in a water supply and discharge pipe 4Bc, a fourth flow rate control valve 4Cd provided in a water supply and discharge pipe 4Bd, a fifth flow rate control valve 4Ce provided in a water supply and discharge pipe 4Be, a sixth flow rate control valve 4Cf provided in a water supply and discharge pipe 4Bf, a seventh flow rate control valve 4Cg provided in a water supply and discharge pipe 4Bg, and an eighth flow rate control valve 4Ch provided in a water supply and discharge pipe 4Bh.

The control unit 4D is an arithmetic device equipped with a central processing unit (CPU) and a storage unit, and sets the supply amount of water by controlling each of the flow rate control valves 4Ca, 4Cb, 4Cc, 4Cd, 4Ce, 4Cf, 4Cg and 4Ch. Further, the control unit 4D reads the water supply information stored in the storage unit as needed. Since the water supply information is set by associating the combustor operating conditions and the supply amount of water with each other, the water supply information is stored in the storage unit in advance. Further, the control unit 4D obtains the combustor operating conditions. The combustor operating conditions are the operating conditions of the combustor 102, and for example, the combustor operating conditions can be detected from the rotational speed of the rotor 104 at the time of low-load operation and high-load operation. In this embodiment, the control unit 4D is connected to the fuel supply device 3, and can acquire the operating conditions of the combustor 102 that is input to the fuel supply device 3 which varies the supply amount of fuel to each main nozzle 2, or can acquire a signal of the fuel supply amount of the fuel supply device 3 that varies the supply amount of the fuel to each main nozzle 2 depending on the operating conditions of the combustor 102. That is, the control unit 4D previously stores the water supply information in which the supply amount of water depending on the combustor operating conditions is set, and sets the supply amount of water by controlling each of the flow rate control valves 4Ca, 4Cb, 4Cc, 4Cd, 4Ce, 4Cf, 4Cg and 4Ch as a variable water supply unit 4C on the basis of the combustor operating conditions and the water supply information.

In this way, the combustor 102 of this embodiment is provided with the water supplier 4 that is connected to each of the main nozzles 2*a*, 2*b*, 2*c*, 2*d*, 2*e*, 2*f*, 2*g* and 2*h* to supply water to each fuel pipe 2B, in the combustor 102 in which the plurality of main nozzles 2 (2*a*, 2*b*, 2*c*, 2*d*, 2*e*, 2*f*, 2*g* and 2*h*) for supplying the fuel is disposed, and the water supplier 4 varies a supply amount of water for each main nozzle 2 to which the water is supplied. Furthermore, the water supplier 4 is equipped with a variable water supply unit 4C that varies the supply amount of water, and a control unit 4D that previously stores the water supply information with the supply amount of water set depending on the combustor operating conditions, and controls the variable water supply unit 4C based on the combustor operating conditions and the water supply information.

According to the combustor 102, the supply amount of water to each of the main nozzles 2*a*, 2*b*, 2*c*, 2*d*, 2*e*, 2*f*, 2*g* and 2*h* in the above-described first to third embodiments can be set depending on the combustor operating conditions. Further, according to the combustor 102, it is possible to suitably change the supply amount of water to each of the main nozzles 2*a*, 2*b*, 2*c*, 2*d*, 2*e*, 2*f*, 2*g* and 2*h* depending on the combustor operating conditions.

Further, the gas turbine 100 of this embodiment is equipped with the above-described combustor 102.

According to the gas turbine 100, the supply amount of water to each of the main nozzles 2*a*, 2*b*, 2*c*, 2*d*, 2*e*, 2*f*, 2*g* and 2*h* in the above-described first to third embodiments can be set depending on the combustor operating conditions. Further, according to the gas turbine 100, it is possible to suitably change the supply amount of water to each of the main nozzles 2*a*, 2*b*, 2*c*, 2*d*, 2*e*, 2*f*, 2*g* and 2*h* depending on the combustor operating conditions. As a result, it is possible to suitably set the supply amount of water to each of the main nozzles 2*a*, 2*b*, 2*c*, 2*d*, 2*e*, 2*f*, 2*g* and 2*h*, depending on the operating conditions of the combustor 102, and eventually, the operating conditions of the gas turbine 100.

According to the present invention, it is possible to suppress an occurrence of combustion vibration, while maintaining low NOx.

REFERENCE SIGNS LIST

2 (2*a*, 2*b*, 2*c*, 2*d*, 2*e*, 2*f*, 2*g* and 2*h*) MAIN NOZZLE
2B FUEL PIPE
4 WATER SUPPLIER
4A WATER SUPPLY UNIT
4B WATER SUPPLY LINE
4C VARIABLE WATER SUPPLY UNIT
4D CONTROL UNIT
100 GAS TURBINE
102 COMBUSTOR

The invention claimed is:

1. A combustor having only one first nozzle configured to receive fuel via a first fuel supply line and a plurality of second nozzles which are positioned around the only one first nozzle and are configured to receive fuel via second fuel supply lines different from the first fuel supply line, the combustor comprising:

a water supplier that is connected to all or part of the plurality of second nozzles and configured to supply water to each of a plurality of fuel pipes, wherein the water supplier is configured to vary water supply for each of the plurality of second nozzles to which the water is supplied, and wherein a first supply amount of water and a second supply amount of water are supplied alternately to the plurality of second nozzles arranged consecutively in a circumferential direction around the only one first nozzle.

2. The combustor according to claim 1, wherein the only one first nozzle is a pilot nozzle and the plurality of second nozzles are main nozzles.

3. The combustor according to claim 1, wherein the water supplier comprises:

a variable water supply unit configured to vary the first supply amount of water and the second supply amount of water; and a control unit configured to store water supply information in which the first supply amount of water and the second supply amount of water depending on an operating condition of the combustor are set, and control the variable water supply unit based on the operating condition of the combustor and the water supply information.

4. A gas turbine comprising the combustor according to claim 1.

5. The combustor according to claim 2, wherein the water supplier comprises:

a variable water supply unit configured to vary the first supply amount of water and the second supply amount of water; and a control unit configured to store water supply information in which the first supply amount of water and the second supply amount of water depending on an operating condition of the combustor are set, and control the variable water supply unit based on the operating condition of the combustor and the water supply information.

6. A gas turbine comprising the combustor according to claim 2.

7. A gas turbine comprising the combustor according to claim 3.

8. A combustor having only one first nozzle configured to receive fuel via a first fuel supply line and a plurality of second nozzles which are positioned around the only one first nozzle and are configured to receive fuel via second fuel supply lines different from the first fuel supply line, the combustor comprising:

a water supplier that is connected to all or part of the plurality of second nozzles and configured to supply water to each of a plurality of fuel pipes, wherein the water supplier is configured to vary water supply for each of the plurality of second nozzles to which the water is supplied, and wherein a first supply amount of water is supplied to some of the plurality of second nozzles arranged consecutively in a circumferential direction around the only one first nozzle and a second amount of water is supplied to others of the plurality of second nozzles arranged consecutively in the circumferential direction around the only one first nozzle.

9. A combustor having only one first nozzle configured to receive fuel via a first fuel supply line and a plurality of second nozzles which are positioned around the only one first nozzle and are configured to receive fuel via second fuel supply lines different from the first fuel supply line, the combustor comprising:

a water supplier that is connected to all or part of the plurality of second nozzles and configured to supply water to each of a plurality of fuel pipes, wherein the water supplier is configured to vary water supply for each of the plurality of second nozzles to which the water is supplied, and wherein the plurality of second nozzles are configured such that supply amounts of water increase or decrease according to an order of the second nozzles in a circumferential direction around the only one first nozzle.

* * * * *